Nov. 7, 1950 E. A. DUNN 2,528,822
AUTOMATIC SHUTOFF VALVE
Filed June 20, 1947
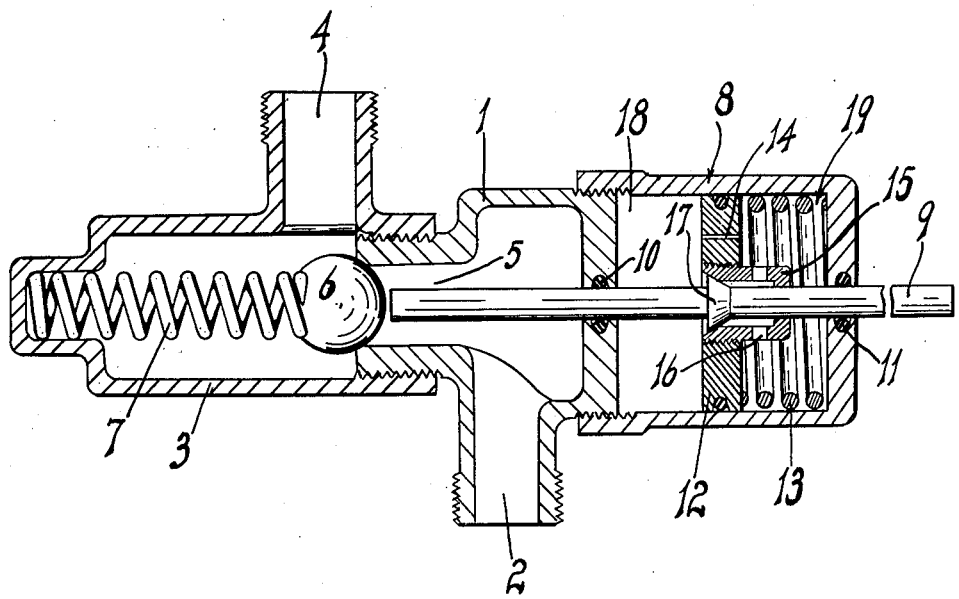
Inventor
Ernest A. Dunn.

Patented Nov. 7, 1950

2,528,822

UNITED STATES PATENT OFFICE 2,528,822

AUTOMATIC SHUTOFF VALVE

Ernest A. Dunn, Long Beach, Calif.

Application June 20, 1947, Serial No. 755,880

2 Claims. (Cl. 251—138)

This invention relates to an automatic shut off valve wherein the flow of fluid through the valve is automatically shut off when the piston of a dash pot has moved a pre-determined distance.

An object of my invention is to provide a novel automatic shut off valve wherein a shaft unseats a ball to open the valve, and in moving this shaft, the piston of a dash pot is permitted to move with the shaft, this piston being urged in one direction by a spring, and the movement of the piston being retarded due to the flow of a fluid through a restricted port.

Another object of my invention is to provide a novel automatic shut off valve which is compact, simple in construction, and the parts of which are simple, and will therefore not get out of order or cease to function.

Other objects, advantages and features of invention may appear from the accompanying drawing, the subjoined detailed description and the appended claims.

In the drawing the figure in the drawing is a longitudinal sectional view of my automatic shut off valve.

Referring more particularly to the drawing, the numeral 1 indicates a valve fitting, and this fitting includes the outlet port 2. A cage 3 is threaded on to the fitting 1, or otherwise removably attached thereto, this cage includes the intake port 4. The fitting 1 includes an opening 5 in which a ball valve 6 is seated. A spring 7 is mounted in the cage 3 and bears against the ball 6, thus urging the ball against its seat and tending to close the passage from the intake 4 to the outlet 2. A cylinder 8 screws on to the fitting 1, or is otherwise detachably secured to the fitting. A shaft 9 extends through the cylinder 8 and into the fitting 1 and is adapted to engage the ball 6 to unseat this ball, and permit the flow of fluid through the valve. Packing 10 in the fitting 1, and packing 11 in the cylinder 8 surrounds the shaft 9 and prevents leakage of fluid past this shaft.

A piston 12 is mounted in the cylinder 8, and the piston is urged inwardly by a relatively light spring 13. The spring 13 has less tension than the spring 7 and the purpose of this will be further described.

A bleed port 14 extends through the piston 12 and the purpose of this bleed port is to allow fluid to pass slowly through the piston and from one side thereof to the other, as the piston tends to move under spring pressure, all of which will be subsequently described.

The piston 12 may be provided with a guide ring 15 through which the shaft 9 extends, and this guide ring is provided with ports 16 through which fluid may pass. A valve head 17 on the shaft 9 fits either in the ring 15 as shown, or in the piston 12, if desired, and when the valve is operating, the valve head 17 is closed. In operation, the shaft 9 is pushed inward manually, and the ball 6 is unseated against the tension of the spring 7. Fluid then flows from the intake port 4 thence through the passage 5 and out through the outlet port 2. As the shaft 9 is pushed inwardly, the valve head 17 is unseated and fluid in the chamber 18 flows past the valve head 17, and through the ports 16 to the chamber 19 on the outer side of the piston 12. The spring 13 will then press the piston 12 inwardly until the piston engages the valve head 17, closing this valve and also preventing further movement of the piston. The ball 6 is opened as previously described, and the spring 7 is tending to close this ball, and also exerts pressure against the shaft 9, and tends to press the piston 12 outwardly, all of which will be evident.

The outward movement of the piston 12 is permitted only by displacement of the fluid on the outer side of the piston, that is, this fluid must flow from one side of the piston to the other. This flow of fluid is permitted by the small port or orifice 14, and therefore, the piston will slowly move outwardly in the cylinder 8, the ball is gradually returned to its seated position, and shuts off the flow of fluid through the valve and the length of time required to again seat the ball 6 is determined by the initial position of the piston 12, that is, it is determined by the amount of inward movement of the shaft 9.

Having described my invention, I claim:

1. A dash-pot mechanism for use with automatic shut-off valves comprising a body having a valve therein, a valve actuating shaft extending into the body to actuate said valve therein, a cylinder on the body and surrounding the shaft, a piston in said cylinder, said piston having a bleed port therein, a valve head on the shaft, said valve head being seated in the piston, and a spring engaging the piston and urging said piston against said valve head.

2. A dash-pot mechanism for use with automatic shut-off valves comprising a body having a valve therein, a valve actuating shaft extending into the body to actuate said valve therein, a cylinder on the body and surrounding the shaft, a piston in said cylinder, said piston having a bleed port therein, said piston being freely moveable longitudinally of the shaft, a valve head on the shaft, a seat in the piston to receive the valve head, said piston having an opening therethrough around the shaft, said opening being closed when the valve head is seated and a spring engaging the piston and urging said piston against said valve head.

ERNEST A. DUNN.

REFERENCES CITED

The following references are of record in the file of this patent:

UNITED STATES PATENTS

| Number | Name | Date |
|---|---|---|
| 1,105,603 | Bardsley | Aug. 4, 1914 |
| 2,148,497 | Peck | Feb. 28, 1939 |
| 2,416,570 | Coleman | Feb. 25, 1947 |

FOREIGN PATENTS

| Number | Country | Date |
|---|---|---|
| 25,138 | Australia | 1930 |
| 663,612 | Germany | 1936 |
| 648,063 | Germany | 1937 |
| 113,913 | Australia | 1941 |